United States Patent [19]
Wille

[11] Patent Number: 5,988,567
[45] Date of Patent: Nov. 23, 1999

[54] CONFORMABLE WEAPONS PLATFORM

[75] Inventor: Robert Henry Wille, St. Charles, Mo.

[73] Assignee: McDonnell Douglas

[21] Appl. No.: 08/885,255

[22] Filed: Jun. 30, 1997

[51] Int. Cl.[6] .................................................. B64C 1/30
[52] U.S. Cl. .................................. 244/129.5; 244/129.4; 244/118.1; 244/119; 89/1.1; 89/1.51
[58] Field of Search ............................. 244/129.4, 129.5, 244/218, 130, 118.1, 119; 89/1.51, 1.1

[56] References Cited

U.S. PATENT DOCUMENTS

| | | |
|---|---|---|
| 2,749,064 | 6/1956 | Kuhlman, Jr. . |
| 2,754,904 | 7/1956 | Provenzano . |
| 3,037,723 | 6/1962 | Taylor .................................. 244/129.5 |
| 3,432,125 | 3/1969 | Schroeder, Jr. . |
| 4,838,502 | 6/1989 | Pinson ........................................ 244/130 |
| 5,222,699 | 6/1993 | Albach et al. ............................ 244/213 |
| 5,279,199 | 1/1994 | August ....................................... 89/1.51 |
| 5,333,528 | 8/1994 | Klestadt et al. .......................... 89/1.51 |
| 5,522,566 | 6/1996 | Hardy et al. .............................. 244/130 |
| 5,794,893 | 8/1998 | Diller et al. .............................. 244/130 |
| 5,803,405 | 9/1998 | Ellis et al. ................................ 244/130 |
| 5,845,879 | 12/1998 | Jensen ...................................... 244/130 |

*Primary Examiner*—William A. Cuchlinski, Jr.
*Assistant Examiner*—Yonel Beaulieu
*Attorney, Agent, or Firm*—Dale B Halling

[57] ABSTRACT

A conformable weapons platform (52) has a cavity (60) in a skin of an aircraft. A weapon launching system (62) is contained in the cavity (60). A pair of elastomer doors (56, 58) are attached to a perimeter of the cavity.

18 Claims, 2 Drawing Sheets

CONFORMABLE WEAPONS PLATFORM

FIELD OF THE INVENTION

The present invention relates generally to the field of aircraft and more particularly to a conformable weapons platform.

BACKGROUND OF THE INVENTION

Aircraft are generally designed to carry their maximum load in the fuselage and/or wings of the aircraft. In modern military aircraft, it is common for the aircraft to have ample thrust to carry larger loads than can fit within its fuselage. One way to take advantage of this extra thrust is to place these oversized loads externally. These external loads are attached to mounts (pylons) on the wings or fuselage. While this allows the aircraft to carry oversized loads, carrying the loads externally significantly increases the aerodynamic drag on the aircraft. This reduces the range of the aircraft and effects the handling of the aircraft. A weapon specific conformable bay has been designed for one weapon. While this significantly limits the drag that results when carrying this weapon, it can only carry the one type of weapon.

Thus, there exists a need for a conformable weapons bay that reduces the drag resulting from externally carried weapons and that can carry multiple weapon types.

SUMMARY OF THE INVENTION

A conformable weapons platform that overcomes these and other problems has a cavity in a skin of an aircraft. A weapon launching system is contained in the cavity. A pair of elastomer doors are attached to a perimeter of the cavity.

DETAILED DESCRIPTION OF THE DRAWINGS

Figure 1:
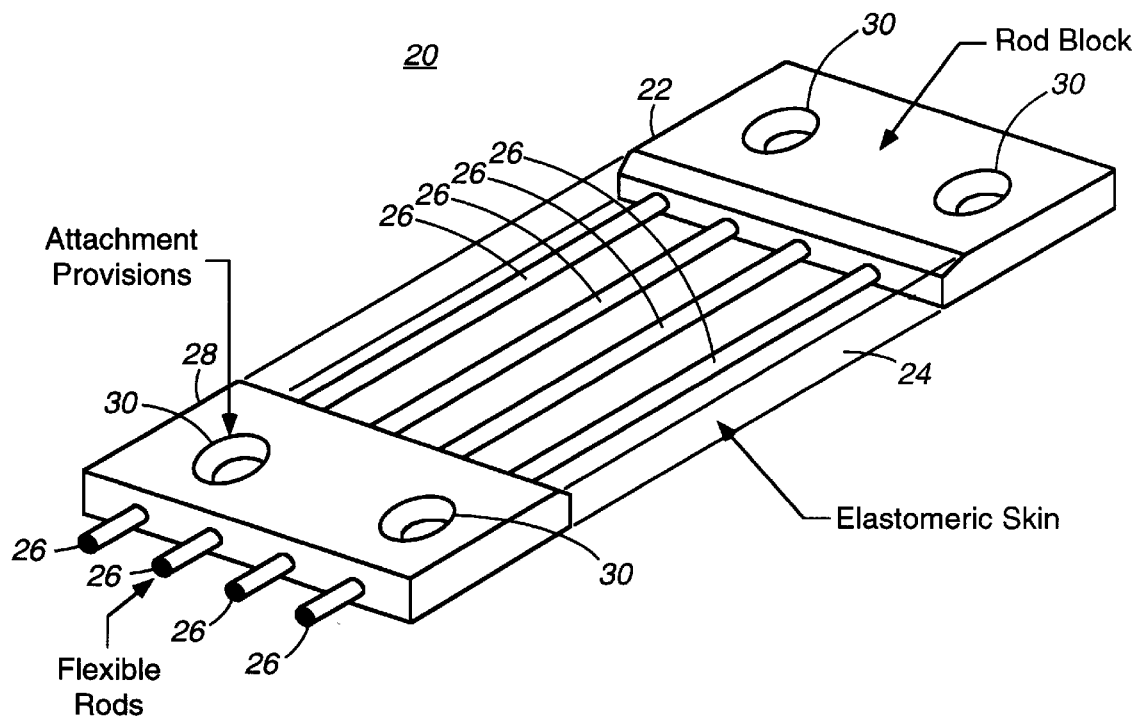
FIG. 1 is a perspective view of a reinforced elastomer panel.

The key to building a conformable weapons platform for an aircraft is using a reinforced elastomer panel as shown FIG. 1 in the design. The elastomer panel 20 has a rod block 22 attached along one edge to an elastomer skin 24. The elastomer skin 24 is capable of stretching to 100% of its unstressed length. In addition, the elastomer skin 24 is capable of twisting. A plurality of rods 26 are attached to the rod block 22 and are allowed to slide freely inside the elastomer skin 24. The rods 26 are made from quartz, epoxy or composites and flex without breaking. The stiffness of these reinforcements is designed to yield a specific expanded shape. The rods 26 provide the elastomer skin 24 with a curvilinear shape when the elastomer panel 20 is elongated, deflected or twisted. This curvilinear shape provides a good aerodynamic shape without any discontinuities that cause turbulence and drag.

A second rod block 28 is attached to an opposite edge of the elastomer skin 24. The second rod block 28 has a plurality of holes through which the plurality of rods 26 are allowed to slide freely. Both the rod block 22 and the second rod block 28 have attachment provisions 30, for attaching the elastomer panel 20 to the surface of an aircraft.

Figure 2:
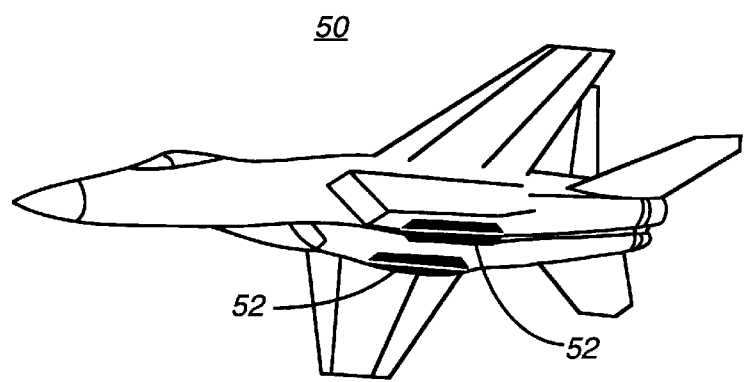
FIG. 2 is a bottom, right perspective view of an aircraft having a conformable weapons platform.
Figure 3:
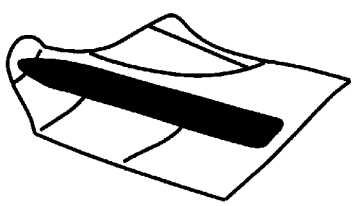
FIG. 3 is a perspective view of the conformable weapons platform of FIG. 2 in a closed position.
Figure 4:
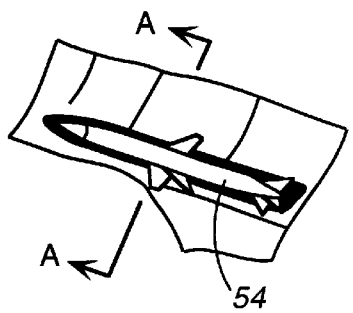
FIG. 4 is a perspective view of the conformable weapons platform in a weapon installed position.

FIG. 2 is a bottom, right perspective view of an aircraft 50 having a conformable weapons platform 52. The conformable weapons platform 52 in FIGS. 2 & 3 is shown in a closed position. In the closed position, a pair of elastomer doors (elastomer door system) cover the weapons platform and conform to the moldline of the aircraft. This eliminates the drag that would occur from having an open cavity. FIG. 4 shows the conformable weapons platform with a weapon 54. In this weapon installed state an expandable bumper conforms to the portion of the weapon inside the weapons platform. This eliminates the drag that would result from having gaps around the weapon 54. The weapons platform also includes an open position for loading weapons.

Figure 5:
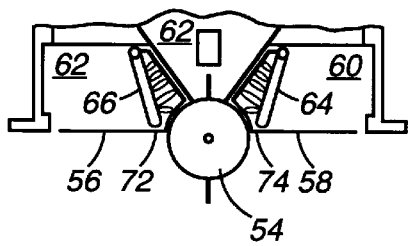
FIG. 5 is a cross sectional view of the conformable weapons platform of FIG. 4 taken along the A—A line.
Figure 6:
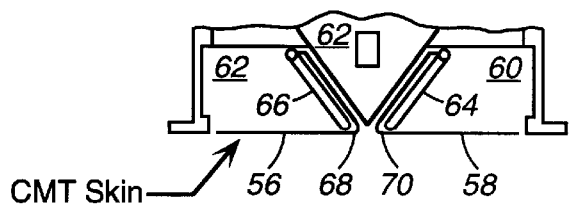
FIG. 6 is a cross sectional view of the conformable weapons platform in a closed position.

FIGS. 5 & 6 are cross sectional views of the conformable weapons platform 52 taken along the A—A line of FIG. 4. A weapon 54 is installed in the conformable weapons platform 52 in FIG. 5. A pair of reinforced elastomer doors 56, 58 have a rigid structural member (rod block) that is attached to a perimeter of the cavity 60 in the skin of the aircraft. The elastomer doors 56, 58 are formed out of an elastomer panel as shown in FIG. 1. A weapon launching system 62 is contained in the cavity (compartment) 60. The weapon launching system (weapon launching mechanism) 62 is a conventional system and is able to hold and launch a variety of weapons. A pair of actuators 64, 66 are connected to the pair of elastomer doors 56, 58 and move the doors 56, 58 from a first position (closed position see FIG. 6) to a second position (weapon installed position see FIG. 5). The pair of actuators (actuator system) 64, 66 are connected to a center edge (access edge) 68, 70 of the elastomer doors 56, 58. An expandable bumper (expandable bumper system) 72, 74 is attached to a side of the actuator panel 64, 66.

Figure 7:
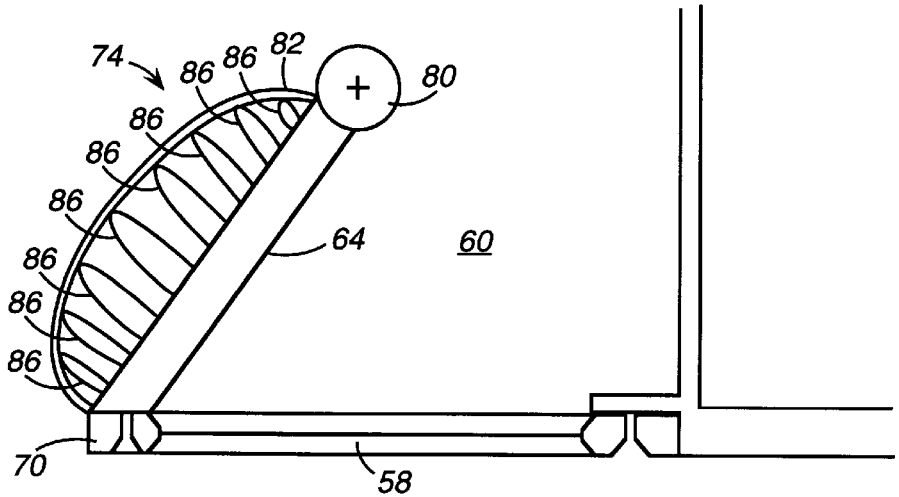
FIG. 7 is a partial cross sectional view of the conformable weapons platform.

FIG. 7 shows one half the conformable weapon platform in more detail. The actuator panel 64 is pivotally attached to the aircraft and has a rotary actuator 80. In one embodiment, the expandable bumper 74, has membrane (inflatable membrane) 82 that can be elastomer (no reinforcing rods). A plurality of balloons 86 are used to expand the bumper 74 so that it cradles the weapon. This eliminates any gaps between the weapon and the cavity (weapon bay) 60 that would result in increased drag. In one embodiment, the elastomer doors 58 are in an expanded state (stretched state) when in a closed position. The unexpanded state (resting state) of the elastomer doors 58 corresponds to a weapon loading position. Because the length of the doors 56, 58 can vary and the expandable bumpers 72, 74 can vary in size to fill in any gaps, the conformable weapon platform 52 is able to accommodate a variety of weapons.

Thus there has been described a conformable weapon platform that reduces the drag associated with carrying weapons externally on the aircraft and can accommodate a variety of weapons. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A conformable weapons platform comprising:
   a cavity in a skin of an aircraft;
   a weapon launching system contained in the cavity; and
   a pair of elastomer doors attached to a perimeter of the cavity and having a closed position that conforms to the moldline of the aircraft and a weapons loaded position wherein the pair of elastomer doors cover a portion of a weapon.

2. The conformable weapons platform of claim 1, further including a pair of actuators, one of the pair of actuators attached to an access edge of one of the pair of elastomer doors.

3. The conformable weapons platform of claim 2, wherein the pair of actuators each have an actuator panel pivotally attached to the aircraft.

4. The conformable weapons platform of claim 3, further including an expandable bumper attached to a side of the actuator panel.

5. The conformable weapons platform of claim 4, wherein the expandable bumper includes an inflatable membrane.

6. The conformable weapons platform of claim 1, wherein the pair of elastomer doors each have a rigid structural member affixed to the perimeter of the cavity, a reinforced elastomer panel attached to the rigid structural member and a center edge attached to an actuator panel.

7. The conformable weapons platform of claim 6, wherein the reinforced elastomer panel is in a stretched state when the pair of elastomer doors are in a closed position.

8. A weapons platform for an aircraft comprising:
   a weapon bay;
   a weapon launching mechanism contained within the weapon bay; and
   an elastomer door system having an open position, that allows access to the weapon bay and the weapon launching mechanism, and a closed position, that conforms to a moldline of the aircraft and a weapons loaded position wherein a pair of elastomer doors cover a portion of a weapon.

9. The weapons platform of claim 8, further including a pair of inflatable bumpers in the weapon bay.

10. The weapons platform of claim 9, wherein the pair of inflatable bumpers conform to a portion of a weapon in a weapon installed position.

11. The weapons platform of claim 10, further including a actuation system connected to the elastomer door system.

12. The weapons platform of claim 10, wherein the elastomer door system comprises a pair of doors.

13. The weapons platform of claim 12, wherein the actuation system comprises a pair of actuator panels pivotally attached to the aircraft.

14. The weapons platform of claim 13, wherein each of the pair of actuator panels is attached to one of the pair of inflatable bumpers.

15. A conformable weapons platform comprising:
   a compartment for holding a weapon;
   a weapon launching system contained in the compartment; and
   an expandable bumper system contained in the compartment and covering a portion of a weapon in a weapon installed positions; and
   an elastomer door system having a closed position where the expandable bumper system is deflated and the elastomer door system conforms to a moldline of an aircraft.

16. The conformable weapons platform of claim 15, further including an elastomer door system for sealing the compartment.

17. The conformable weapons platform of claim 16, wherein the expandable bumper system is retracted when the elastomer door system is in a closed position.

18. The conformable weapons platform of claim 15, wherein the weapon launching system is capable of holding a variety of weapons.

* * * * *